Oct. 28, 1969     H. C. GEEN ET AL     3,475,229
PROCESS FOR TREATING ARTICLES OF MANUFACTURE
TO ELIMINATE SUPERFLUOUS PROJECTIONS
Filed April 22, 1968     3 Sheets-Sheet 1

STEP 1

STEP 2

STEP 3

STEP 4

INVENTORS
HENRY C. GEEN
EDWIN E. RICE
BY
Miller Morriss Pappas & McLeod
ATTORNEYS Oct. 28, 1969    H. C. GEEN ET AL    3,475,229
PROCESS FOR TREATING ARTICLES OF MANUFACTURE
TO ELIMINATE SUPERFLUOUS PROJECTIONS
Filed April 22, 1968    3 Sheets-Sheet 2

INVENTORS
HENRY C. GEEN
Edwin E. Rice
BY
Miller Morriss Pappas & McLeod
ATTORNEYS

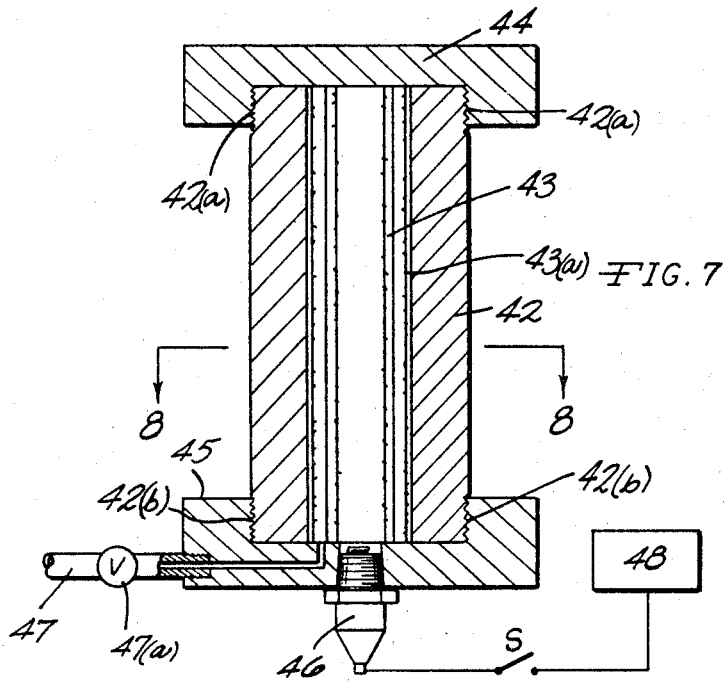
FIG. 7
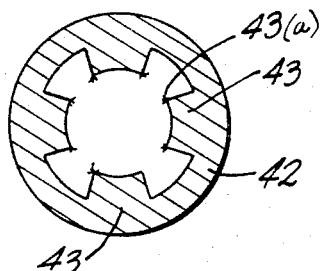
FIG. 8
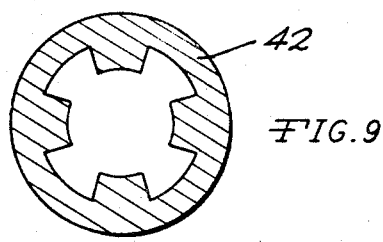
FIG. 9
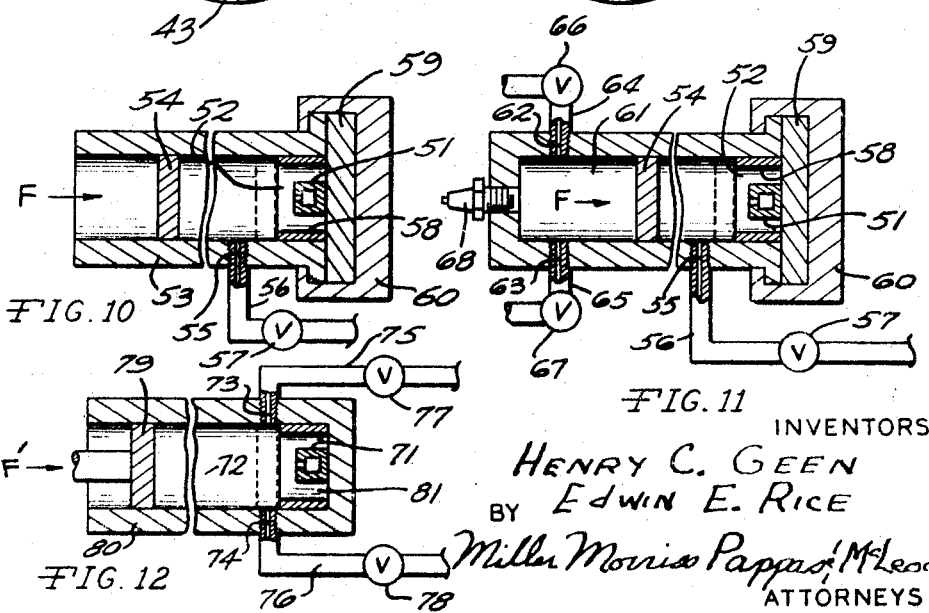
FIG. 10
FIG. 11
FIG. 12
INVENTORS
HENRY C. GEEN
EDWIN E. RICE
BY Miller Morris Pappas, McLeod
ATTORNEYS United States Patent Office 3,475,229
Patented Oct. 28, 1969

3,475,229
PROCESS FOR TREATING ARTICLES OF MANUFACTURE TO ELIMINATE SUPERFLUOUS PROJECTIONS
Henry C. Geen and Edwin E. Rice, Ann Arbor, Mich., assignors to Chemotronics, Incorporated, Ann Arbor, Mich., a corporation of Michigan
Continuation-in-part of application Ser. No. 643,890, June 6, 1967. This application Apr. 22, 1968, Ser. No. 723,052
Int. Cl. B23k 27/00
U.S. Cl. 148—9                                    24 Claims

ABSTRACT OF THE DISCLOSURE

A sealed system process for the elimination (destruction or removal) of superfluous projections, such as unwanted burrs and sharp edges, on shaped or fabricated articles of manufacture, particularly those produced by mechanical shaping or fabricating, by treatment with transient elevated gaseous temperatures in a sealed and confined space. The transient elevated gaseous temperatures in the sealed and confined space are produced, for instance, by the ignition or other suitable reaction initiation of various compositions which are exothermic in the sealed and confined space, by the rapid and substantially adiabatic compression of a gas in the sealed and confined space or by some other manner such as by the rapid movement of a heated gas wave under pressure through the sealed and confined space, such as exists in a shock wave, so that the transient elevated gaseous temperatures are produced. The transient elevated gaseous temperatures that eliminate the superfluous projections usually have a duration of less than one second and the process is essentially self-limiting and selective in the removal of the superfluous projections. Various means of aiding the elimination of the superfluous projections are also described Cross-reference to related applications This application is a continuation-in-part of our earlier application, Ser. No. 643,890, filed on June 6, 1967, now abandoned.

Summary of invention

The present invention relates to a sealed system process for the elimination (destruction or removal) of superfluous projections on shaped or fabricated articles of manufacture. In particular, the present invention relates to a process wherein transient elevated gaseous temperatures in a sealed and confined space are utilized to eliminate (destroy or remove) the superfluous projections within the sealed and confined space.

Prior art

There are numerous processes known to the art for the elimination of superfluous projections including unwanted burrs and sharp edges on mechanically shaped or fabricated articles of manufacture, particularly various hand or machine abrading and cutting techniques. Similar it is known to locally apply a flame from a torch or the like to the mechanically shaped or fabricated article of manufacture which melts the superfluous projections to destroy and/or round them. Further, chemical etching is used wherein the part is subjected to a liquid or gaseous chemical treatment at either ambient or elevated temperatures in which the liquid or gas chemically react with the workpiece to remove the superfluous projections including unwanted sharp portions of edges and burrs. Additionally, electrochemical machining is used wherein the article is immersed in an electrolyte and an electric current is passed between the projection and a carefully placed electrode to electrolytically remove the superfluous projections. The problem in these instances is that the base dimensions of shaped or fabricated articles of manufacture can be substantially changed during destruction or removal of the superfluous projections because such known processes inherently are not self-limiting and in fact such various techniques result in either an incomplete removal of the superfluous projections or in the removal of useful material from the article of manufacture as a result, for example, of too much abrading contact, or distortion or alteration of the established physical and dimensional properties of the article of manufacture as a consequence of localized prolonged heating with the flame, or too extensive treatment or imperfect placement of electrodes, poor electric current control, inaccessibility of the projection, improper electrode placement, and the like. Major deficiencies of the prior art processes are their dependence on the geometry and location of the superfluous projections (which are generally non-uniform and unpredictable) and of the geometry of the article which results in their inability to invariably remove the projections and, when projections occur at difficultly accessible locations, such as at intersections of drilled holes inside solid parts, they characteristically cannot be consistently removed by such prior art means. Additionally, the inherently non-self-limiting character of the prior art processes often results in removal of useful base material by random over-treatment of the part in localized or general context dependent upon the prior art process selected.

It is therefore an object of the present invention to provide a process wherein the essential dimensions of the shaped or fabricated article of manufacture are not changed as a result of the elimination (destruction or removal) of the superfluous projections. Further, it is an object of the present invention to provide a process wherein the surfaces of the shaped or fabricated article of manufacture are uniformly treated in the elimination (destruction or removal) of the superfluous projections. Further still, it is an object of the present invention to provide a process which is inherently self-limiting so that proper treatment or over-treatment, within the ranges of the application of the process, will not result in damage to or removal of useful and wanted material from the shaped or fabricated article of manufacture or in significant dimensional or surface area changes thereof.

Another object is to provide a process accomplishing removal of superfluous projections which has no detrimental consequences on the physical characteristics of the base material of the part or object treated. These and other objects will become increasingly apparent by reference to the following description and the drawings.

Figure 3:
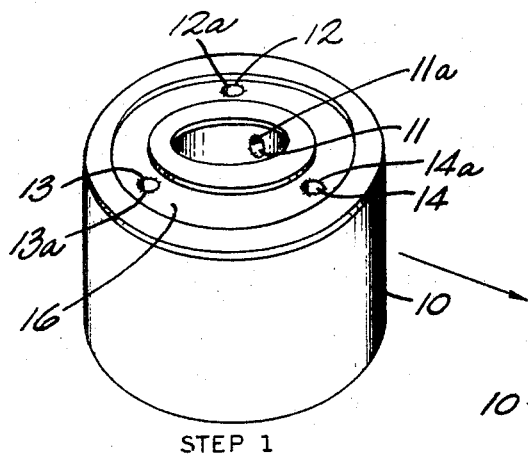
Figure 3:
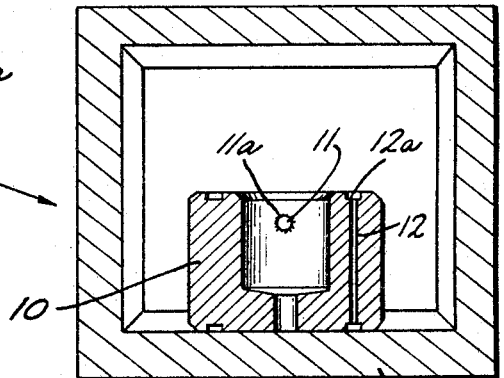
Figure 3:
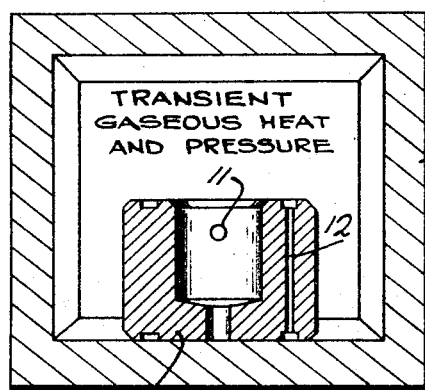
Figure 3:
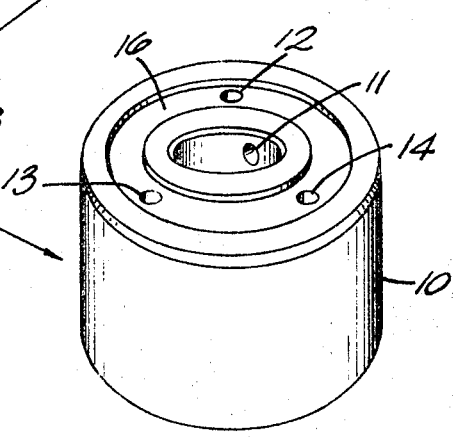

FIGURE 3 is a schematic view of the steps in the process of the present invention illustrating the process for eliminating (destroying or removing) the burrs on the article of manufacture (FIGURE 1) in Step 1 to produce the article of manufacture in Step 4 by providing the article in a sealed and confined space with open spaces within the sealed and confined space adjacent to the burrs in Step 2 and subjecting the article to transient elevated gaseous heat in Step 3.

Figure 4:
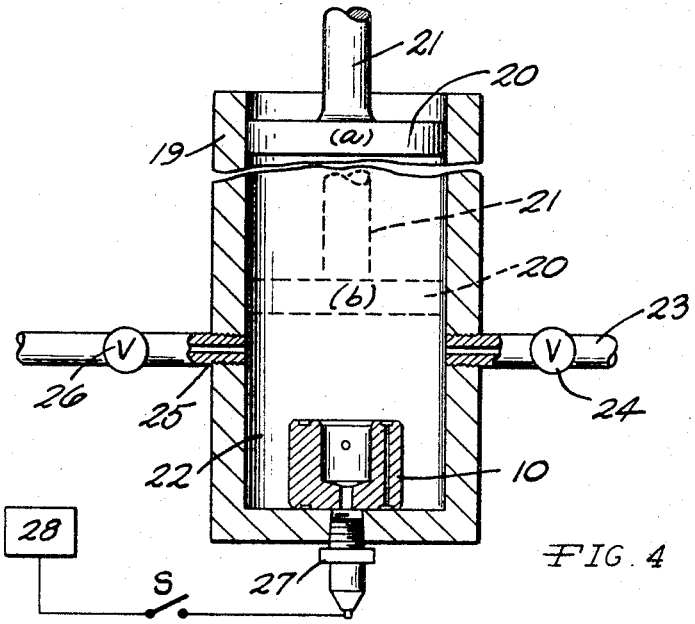

FIGURE 4 is a front cross-sectional view of one embodiment of preferred equipment used in the process of the present invention in Steps 2 and 3 as shown in FIGURE 3.

Figure 5:
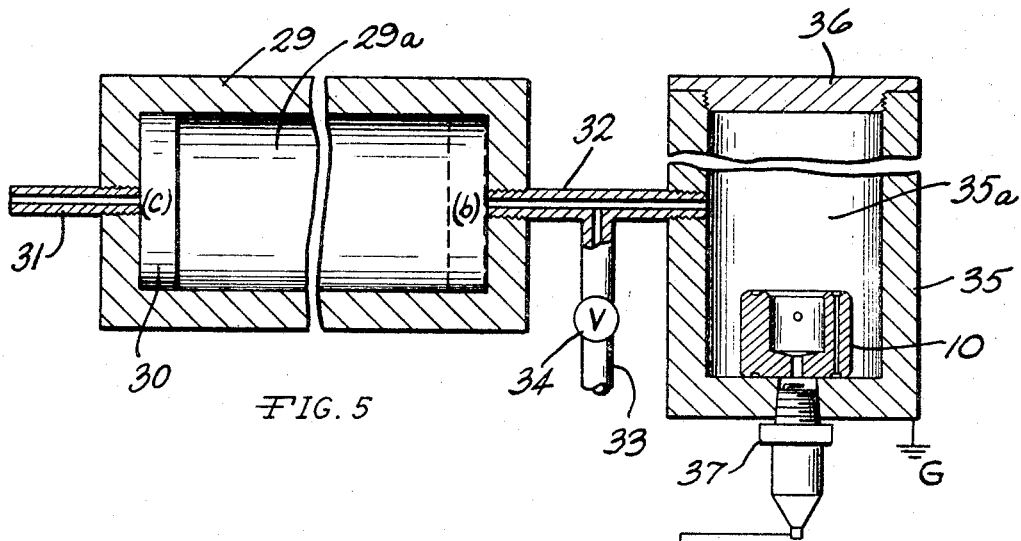

FIGURE 5 is a front cross-sectional view of another embodiment of preferred equipment used in the process of the present invention in Steps 2 and 3 as shown in FIGURE 3.

Figure 6:
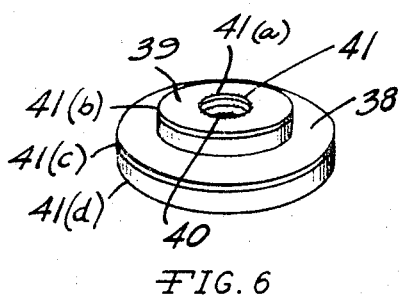

FIGURE 6 is a front perspective view of a mechanically shaped plastic article of manufacture particularly illustrating unwanted burrs on the threads and machined surfaces to be removed and sharp edges to be rounded before treatment by the process of the present invention.

FIGURE 7 is a front cross-sectional view of equipment used in the process of the present invention wherein the article with the superfluous projections defines part of the confined space.

FIGURE 8 is a top cross-sectional view through line 8—8 of FIGURE 7, illustrating the burrs within the article before the operation of the process of the present invention.

FIGURE 9 is a top cross-sectional view of FIGURE 8, illustrating the article with the burrs removed.

FIGURE 10 is a schematic full section elevation view of a chamber in which a free piston is provided to which a high force F is applied thereby compressing gases in contact with the part adiabatically to accomplish removal of superfluous projections.

FIGURE 11 is a schematic full section elevation view of a chamber as in FIGURE 10 wherein the force F is applied as by an explosive material to drive the free piston and adiabatically compress gases in contact with the part to accomplish a transient gaseous heating and remove superfluous projections.

FIGURE 12 is a schematic full section elevation view of a chamber for applying a transient elevated gaseous temperature by autogenetic or autoignition of a fuel mixture and wherein force F applied to the piston accomplishes adiabatic compression which supplies the heat required for ignition.

General description

The present invention generally relates to the process for the elimination of superfluous thin cross-section projections including unwanted sharp edges and burrs on an article of manufacture with a much thicker cross-section, the projections being produced as the result of shaping or fabricating which forms the article of manufacture from the original material or materials of construction, which comprises: providing a sealed and confined space surrounding the superfluous projections to be eliminated on the shaped or fabricated article of manufacture such that there are open spaces within the sealed and confined space surrounding the superfluous projections to be eliminated; and producing transient elevated gaseous temperatures in the open spaces within the sealed and confined space sufficient to eliminate the superfluous projections without damage to or significant dimensional alteration of the article of manufacture.

The present invention particularly relates to the process for the elimination (destruction or removal) of superfluous thin cross-section surface projections including unwanted burrs and sharp edges resulting from the mechanical shaping of a relatively much thicker cross-section article of manufacture which comprises: (a) providing the mechanically shaped article of manufacture with the superfluous projections composed of a material or materials and with a structure such that it resists damage when exposed to transient elevated gaseous temperatures and pressures sufficient to eliminate the superfluous projections and any damageable essential parts of the structure being protected from such transient elevated gaseous temperatures and pressures; (b) introducing the article with the superfluous projections into a sealed and confined space defined by walls capable of withstanding the transient elevated gaseous temperatures and pressures sufficient to eliminate the superfluous projections so that there are open spaces within the sealed and confined space surounding the superfluous projections; (c) producing transient elevated gaseous temperatures and pressures in the sealed and confined space sufficient to eliminate the superfluous projections without damage to the article of manufacture; and (d) removing the article of manufacture, with the superfluous projections eliminated, from the sealed and confined space.

As used herein the term "superfluous projections" means any portion of the surfaces of the article which the elevated gaseous temperatures in the sealed and confined space acts upon to effect destruction, removal, rounding, such as with the sharp part of edges, or any other localized dimensional changes of portions of the surfaces which does not substantially affect the established or desired base dimensions of the article. In the usual present process treatment of a mechanically shaped or fabricated article of manufacture, the surfaces are smoothed, burrs and sharp edges are removed or destroyed and the surfaces are smoothed, rounded or radiused. In general such superfluous projections are characterized by having a thin cross-section at some point which the elevated gaseous temperatures are able to act upon to effect the localized dimensional change without substantially acting upon or affecting the thicker cross-section base article.

Numerous methods for mechanically shaping or fabricating articles of manufacture are known such as cutting, drilling, milling, trepanning, casting, grinding, lapping, stamping, forging, broaching, tapping, planing, extruding, molding, casting, cold forming, welding, explosive forming, weaving or knitting of fibers, laminating, and the like. Also known is electrical shaping such as electrical and electrochemical deposition and removal of various materials onto or from a substrate and electrochecical machining. Further, chemical shaping is known as with etching using acids and the like. In each instance, the usual result of the shaping or fabricating is that superfluous thin cross-section projections or protrusions are produced on the shaped article of manufacture by way of burrs, flashings, unwanted sharp edges and the like. The most common superfluous projections result from mechanical shaping, particularly machining, and it is preferred to utilize the process of the present invention on such projections because they are so distinctly formed by the mechanical shaping. The forming or shaping of various articles of manufacture produces this result in the course of producing the necessary base dimensions of the article. The projections can be macroscopic as in the case of burrs or microscopic as in the case of surface irregularities. It has been unexpectedly found that these superfluous projections including unwanted burrs and sharp edges can be eliminated (destroyed or removed) by treatment of the article with transient elevated gaseous temperatures in a sealed and confined space.

In finished or semi-finished articles of manufacture the forming, shaping and machining operations establish a base or intermediately dimensioned element, but not infrequently the same forming, shaping or machining leaves integral surface imperfections in the form of projections, usually having a substantially reduced cross-section in relation to the adjacent portion of the parent dimensioned article. The object, then, is to remove this superfluous material from the parent dimensioned article without substantially altering the configuration and working dimensions of the parent article. The process for removal must be selective and should sense automatically the transition in cross-section as between the dimensioned and configured body of the part and unwanted projections consequent to prior fabricating, forming, shaping or machining. Finally, as the process eliminates the superfluous projecting material, the remaining surface should be smooth, uncratered and transitional to the adjacent configured and dimensioned surfaces. In practice, for example, an unwanted sharp edge must become a rounded or chamfered surface and flashing, for example, must be stripped to cause the area to substantially blend with the planes or surfaces adjacent to it in a manner to avoid material interference with the established dimensions and contours of the article of manufacture.

Transient elevated gaseous temperatures can be generated in a sealed and confined space in various ways, such as by the ignition or suitable other reaction initiation of compositions which produce this result, by adiabatic compression of gases and by generating shock waves which produce transient heated gas waves in the sealed and confined space in a manner such that the surfaces of shaped articles of manufacture which have superfluous projections including unwanted sharp edges and burrs are heated for only a very brief period of time. It is believed that because of the inherent differences in the ratios of the surface areas to heat capacities or mass of the superfluous or unwanted thin cross-section projections and the rest of the article, the projections or edges are essentially instantaneously heated to much higher temperatures than the balance of the shaped article and are thus preferentially destroyed or removed without causing the shaped article to be heated sufficiently to damage its essential parts. The heating must be done very rapidly in order to minimize the effect of heat transfer (which is time dependent) from the superfluous projection into the greater mass of the shaped article (or into the masking heat sink used to protect damageable parts of the article). Additionally, this process is self-limiting because the ratio of surface area to heat capacity or mass becomes essentially the same as the balance of the shaped article on the area or cross-section formerly covered by the superfluous projection when the projection is removed by the results of differential heating; thus differential heating of that portion of the shaped article ceases and no additional material is removed once the projection preferentially is destroyed or removed. In each case the heated gas acts upon the unwanted projection to effect a removal by destruction in the case of burrs and by radiusing or chamfering sharp edges because these are high surface area to low volume portions of the article in contact with the heated gas. This fact enables the use of sufficiently large transient thermal energies and temperatures with any given shaped article to eliminate the largest and most massive unwanted projections on that article without dangerously over-treating other areas of the same article which bear less massive superfluous projections. When combustible or decomposable gases are used to create the transient elevated temperatures, all void spaces adjacent to the shaped article contain the gas or gases at a uniform thermal energy per unit of volume and all projections and surfaces are treated for essentially the same length of time and at essentially the same transient temperature level, thus resulting in the essentially simultaneous elimination of all superfluous projections which have a void space adjacent thereto, regardless of their size, location or number. It has been found that there is a wide operating range of thermal energy allowable per unit volume of the material used to provide the transient elevated temperatures and that this range is governed by the parameters of using not less than the thermal energy required for adequate projection removal on the lower limit and not enough thermal energy on the upper limit to result in heating the entire mass of the shaped article to the point where it becomes damaged. These limits vary with the nature of the material being treated and are dependent on such factors as the melting, sublimation, or decomposition temperature of the material and its thermal conductivity and specific heat, as is shown in the following examples. Slow heating would allow heat equilibration and would thus eliminate any differential heating between the superfluous projections and the balance of the shaped article so is therefore not suitable for removing superfluous projections without also heating all of the shaped article to temperatures sufficient to destroy or remove the superfluous projections. Such slow heating would thus obviously also cause damage to the shaped article by raising it to damaging temperatures. The result of the transient heating is that the superfluous projections are differentially heated and are destroyed or removed without damage to the shaped or fabricated article of manufacture.

While the transient gaseous thermal energy is primarily all that is needed to accomplish the removal of the superfluous projections, the generation of the transient thermal energy will generally cause a transient pressure increase within the sealed and confined space whenever a gas is present during the transient thermal energy release and therefore the sealed and confined space must be constructed to withstand the pressure increase without rupture.

The shaped or fabricated article of manufacture must be composed of a material or materials and have a structure such that it resists damage at the elevated gaseous temperatures for the short periods of time necessary to remove the superfluous projections or must be protected by the use of appropriate fixtures or coatings which provide masking, shielding or heat sink effects to the essential parts during the transient heating. Within this limitation shaped polymers, metals, natural materials and compositions, alloys, glasses, cermets, ceramics and like materials alone or in combination can be treated by the process of the present invention. If thin cross-section projections or areas on or in the shaped article of manufacture are to be preserved, such as knife edges or thin wall sections, they must be masked or covered or heat sinked so as not to be heated to a damaging extent by, or directly exposed to, the transient elevated gaseous temperatures.

The shaped or fabricated article of manufacture is provided in the sealed and confined space so that there are open spaces surrounding the superfluous projections. It is important that the projections be exposed via void space to the transient elevated gaseous temperatures so that they will be eliminated (destroyed or removed). Without this exposure the superfluous projections are masked, heat sinked or protected and are therefore not eliminated.

Figure 1:
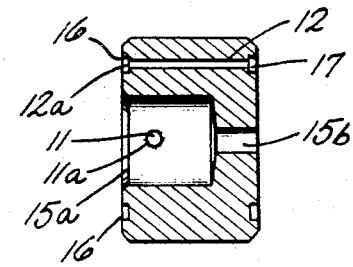
FIGURE 1 is a front cross-sectional view of a mechanically shaped steel article of manufacture particularly illustrating burrs resulting from drilling before treatment by the process of the present invention.
Figure 2:
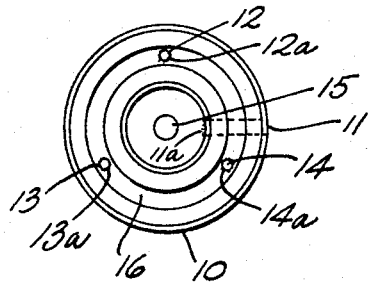
FIGURE 2 is a plan view mechanically shaped article of manufacture shown in FIGURE 1 illustrating burrs resulting from drilling before treatment by the process of the present invention.

FIGURES 1 and 2 illustrate a precision mechanically shaped steel article 10 which is used in diesel engines, before treatment by the process of the present invention. The part comprises a cylindrical body 10 which is 0.73 inch in diameter and 0.62 inch long with a large hole 15a (0.36 inch in diameter) part way through the cylindrical body and a small hole 15b (0.08 inch in diameter) the remaining way through the cylindrical body 10 along its central axis. Two opposing grooves 16 and 17 (0.03 inch deep and 0.13 inch wide on a 0.53 inch diameter circle) are provided on the ends of the cylindrical body 10 with three holes 12, 13 and 14 (0.04 inch in diameter) drilled between them. A hole 11 (0.06 inch in diameter) is provided perpendicular to the central axis of the cylindrical body 10. Burrs 11a, 12a, 13a, and 14a result from drilling the small diameter holes 11, 12, 13 and 14 which are difficult to remove because of their small size and position on the article 10.

Referring to FIGURE 3, the mechanically shaped article 10 (Step 1) shown in FIGURES 1 and 2 is provided in the sealed chamber 18 (Step 2). The mechanically shaped article 10 is then subjected to transient elevated gaseous temperatures such that the projections 11a, 12a, 13a and 14a are eliminated (Step 3) and then the mechanically shaped article 10 is removed from the chamber 18 (Step 4).

Having generally described the process of the present invention the following specific description discloses the invention in more detail.

Specific description

The following are specific examples of the process of the present invention in one preferred embodiment.

Example I

FIGURE 4 illustrates preferred equipment as shown in FIGURE 3 used in the process of the present invention for producing transient elevated gaseous temperatures in a sealed and confined space. In particular, a mechanically shaped article of manufacture 10 with drilling burrs 11a, 12a, 13a and 14a as shown in FIGURES 1, 2 and Step 1 of FIGURE 3 is provided in a confined space 22 formed by a cylindrical chamber 19 capable of being sealed from the atmosphere and the fuel gas mixture supply and fitted with a piston 20 and driving arm 21 which can be mechanically, hydraulically or pneumatically actuated (not shown). At the end of and leading into the chamber 19 opposite the piston 20 a spark plug 27 is provided which is electrically connected to an ignition system 28 which is energized by a switch S. Through the chamber walls and leading into the chamber 19 are provided a pipe 23 with a valve 24 and a pipe 25 with a valve 26 which are to be considered as closed. The inside measurements of the confined space 22 were two inches (2") in diameter and eighteen inches (18") long with piston 20 fully retracted.

Referring to FIGURES 1 and 2, a mechanically shaped article of manufacture 10 with burrs 11a, 12a, 13a and 14a is provided. The article 10 was made of steel as described above.

The mechanically shaped article 10 was placed in the chamber 19 shown in FIGURE 4 by removing the piston which was then replaced and maintained in position a. Valve 24 on pipe 23 was then opened and the air in the confined space 22 was evacuated using a vacuum pump (not shown) and then valve 24 was closed. The air was evacuated to assure a uniform distribution of the fuel gas mixture in the open spaces within the confined space 22, but need not be evacuated if adequate mixing of the fuel gas mixture with the entrapped air is arranged such as by properly porting the fuel gas mixture or by using elevated pressures and allowing time for the gases to mix by diffusion. A gaseous mixture of hydrogen 55% by volume and oxygen 45% by volume was then introduced through pipe 25 into the confined space 22 at ambient conditions of temperature and 50 p.s.i.g. pressure and then the valve 26 was closed to accomplish sealing. The piston 20 was then moved to position b to compress the mixture of hydrogen and oxygen in the chamber 19 to a pressure of 550 p.s.i.g. (37.5 atmospheres absolute) and fixed in this position. At this point in the process the confined space 22 is sealed off from the atmosphere, supporting equipment and fuel gas mixture supply. The gaseous mixture was then ignited using the spark plug 27 actuated by the switch S and ignition means 28. The shaped article 10 was then removed from the chamber 19 by removing the piston 20.

The shaped article of manufacture 10 was found to have the major portions of the projections 11a, 12a, 13a and 14a removed with a small rounded lip of material from the original burr remaining as a raised portion around the edge of the drilled hole without damage to the shaped article 10. An oxide residue film was present on the surfaces which was easily removed by washing in a water solution of (preferably inhibited) hydrochloric acid.

Example II

The process of Example I was repeated at a final charge pressure of 900 p.s.i.g. (62.0 atmospheres absolute) and it was found that the burrs were totally removed from the shaped article 10 and no lip from the burr remained. Replication of the treatment at 1100 p.s.i.g. (77.9 atmospheres absolute) final charge pressure produced the same results. In Examples I and II, pressure or strain gauge measurements recorded the treatment on a storage oscilloscope indicating that the hydrogen and oxygen mixtures detonated.

Example III

The process of Example II was repeated except that a mixture of 25% by volume Texas natural gas (more than 90% methane) and 75% by volume oxygen at a charge pressure of 800 p.s.i.g. was ignited. The results were the same as in Example II.

Examples I, II and III illustrate a preferred process for the removal of superfluous projections from shaped steel articles of manufacture and also illustrate the wide variation in successful treatment conditions which can be used. Because of the high melting point and high thermal conductivity of steel, high transient thermal energies and temperatures must be generated in the sealed and confined space to destroy or remove the superfluous projections and this is true of high thermal conductivity and high melting or reaction and/or decomposition-resistant materials in general. Where polymers and organic materials are treated by the process of the present invention, which generally have lower thermal conductivity and lower melting or reaction and/or decomposition points, lower transient temperatures are used so that the shaped article of manufacture is not damaged. Illustrative is the following Example IV.

Example IV

The process of Example I was repeated with a methyl methacrylate resin mechanically shaped article of manufacture of the design shown in FIGURE 6 with threads 41 (13 to the inch) through a hole 40 (½ inch in diameter) through the central axis of a cylindrically shaped member 38 (1.88 inches in diameter by 0.26 inch thick) with a lip 39 (1.12 inches in diameter by 0.26 inch thick) surrounding the hole 40 on one side. The threads 41 and other machined surfaces (edge of cylindrically shaped member 38) were frosted in appearance and rough with burrs 41a as a result of the threading and machining operations and the remainder of the polymer was transparent. The threads also had sharp edges. The edges 41b, 41c and 41d were also sharp because of the shaping of the part on a lathe. The piston 20 was used to compress a mixture of 78% by volume hydrogen and 22% by volume oxygen to a pressure of 30 p.s.i.g. (3.0 atmospheres absolute) and then the mixture was ignited by the spark plug 27. After ignition the mechanically shaped article 38 was removed from the chamber 19 and it was found that the article 38 was completely transparent and smooth including the threads and other machined surfaces and no sharp edges remained.

Besides illustrating the lower transient gaseous thermal energies and temperatures used when treating polymers, Example IV provides a visual demonstration of the effect of the transient elevated gaseous temperatures in the removal of superfluous projections including the sharp edges. In general the surfaces and/or sharp edges of the article are smooth as a result of the process of the present invention and this is particularly evident with polymers as shown from Example IV.

For resinous or polymeric materials with low melting or decomposition points it has been found that it is preferred to use a combustible gaseous mixture of hydrogen or methane with oxygen which is compressed to a pressure of about 1 atmosphere absolute or above, usually between about 3 to 10 atmospheres absolute; with metals about 25 atmospheres absolute or above; usually for ferrous and other high melting point metals between about 25 to 150 atmospheres absolute and for most non-ferrous metals between about 25 to 100 atmospheres absolute. Other materials are treated at the same pressures of compression of the combustible gaseous mixture usually between about 1 atmosphere to 150 atmospheres, depending upon the reactivity, melting or decomposition point of the particular material involved. Thus for example some glasses are generally treated the same as resinous materials while refractory ceramics or alloys are usually treated at very elevated compression pressures of above 100 atmospheres and, in certain instances, above 150 atmospheres. Other combustible gaseous mixtures are compressed in the manner of hydrogen or methane and oxygen to give comparable thermal energies.

In general, it has been found that with articles which melt rather than decompose or sublime upon heating there is a very thin layer of recast material where burrs formerly were present. Also, the sharp edges of such articles are rounded. Thus with metals such as the article in Examples I, II and III, this result has been observed from standard photomicrographs using standard metallurigical techniques. The result of rounding sharp edges is in many instances that such articles are uniquely suited for the particular end use, particularly with precision metal articles of manufacture, such as fluid flow components.

Various compositions which can be ignited, exploded, decomposed or detonated to produce transient elevated gaseous temperatures can be provided in the sealed and confined space. They can be solid, liquid or gaseous prior to the ignition or other initiation of the reaction by other suitable means. The gaseous compositions are preferred for reasons of uniformity of treatment, ease of use and economy. When liquid or solid ignitable materials are used, care must be taken to position them in relation to the unwanted projections including burrs and sharp edges so that there is sufficient thermal energy available and provided in the void space adjacent to the unwanted projections to accomplish the effective removal of the unwanted projections. In some cases it is also desirable to additionally fill the sealed and confined space with a gas, either of a reacting or non-reacting composition with respect to the part to be deburred, at either reduced, ambient or elevated pressures, so that the part is more uniformly treated or, as in the case of a reactable gas, the ignition or reaction initiation of the solid or liquid ignitable or reactable material initiates the desired secondary reaction between the burr and the reactable gas. Gases such as oxygen, chlorine or hydrogen are examples of reactable gases whose reaction with the superfluous projection can be initiated by exposure of the projection to transient elevated temperatures while the projection is in the presence of the reactable gas or mixture of such gases.

Combustible mixtures of oxidizable materials and oxidizer materials can be used to generate the transient elevated gaseous temperatures and are preferred. Hydrogen or natural gas are preferred oxidizable materials because they can be compressed to high pressures at ambient temperatures without liquifying, the superior results obtained and because of low cost and ease of availability. Lower alkanes, alkenes and alkynes containing 1 to 4 carbon atoms, individually or in mixture as oxidizable materials, can be used with good results. Other oxidizable materials which can be used are for instance ammonia, hydrazine, hydrogen sulfide, carbon monoxide and various hydrocarbons such as acetylene, ethylene oxide and cyanogen. Suitable oxidizer materials are pure oxygen which is preferred, oxygen with gaseous diluents such as air, air alone, halogens such as fluorine and chlorine, ozone and various perchlorates and nitrogen oxides. Mixtures of single or multiple oxidizer materials with single or multiple oxidizable materials can be used.

Various compounds which rapidly decompose with accompanying transient release of thermal energy upon suitable initiation can also be used singly or multiply to produce the transient elevated gaseous temperatures such as acetylene, nitrogen dioxide, pentaerythritol tetranitrate, nitroglycerine and the like. Where solid or liquid decomposable or detonatable compositions are provided in the chamber 19 as shown in FIGURE 4, the air need not be evacuated from the chamber 19 although such compositions can be used in an evacuated chamber as they generate large quantities of transiently heated gas.

In certain instances elevated, ambient or reduced pressures can be provided in the chamber 19 prior to ignition of the ignitable composition or initiation of the reaction in the decomposable material. In general, the selection of the transient energy liberated in the sealed and confined space can be easily regulated by adjusting the amount of ignitable composition or decomposable material and the conditions under which it is ignited or decomposed so that the superfluous projections are destroyed or removed without damage to the shaped article of manufacture. In general, transient low energy conditions will be selected for articles composed of low melting, low thermal conductivity or temperature sensitive materials (such as polymers) and transient high energy conditions for high melting, high thermal conductivity or relatively temperature insensitive materials (such as structural metals).

In certain instances in order to aid in the removal of the superfluous projections, it is preferred to have oxidizing conditions in the confined space by providing an oxidizer material which reacts with the superfluous projections on the article of manufacture. When an oxidizer material is used, the superfluous projections are oxidized and this treatment is particularly useful in the treatment of ferrous metals and thermoset or cross-linked polymers. Thus in Examples I, II and III, a molar excess of oxygen was used over the stoichiometric amount needed to react with hydrogen or methane which melted and oxidized the projections to iron oxide upon ignition and which was then removed using a dilute acid solution (preferably inhibited) or other metal cleaning solution. In certain instances reducing conditions are preferred, particularly with thermoplastic polymers and non-ferrous metals, so that they do not become oxidized, by providing an excess of reducing material in the confined space and this is shown in Example IV wherein a molar excess of hydrogen is provided over the stoichiometric molar amount needed to react with the oxygen.

In order to facilitate removal of the superfluous projections, particles of a solid material were provided in the confined space which upon ignition or other suitable reaction initiation of the composition to produce the transient elevated temperatures and pressures caused the particles to become projectiles which facilitated the removal or destruction of the superfluous projections. Illustrative is the following Example V.

Example V

The process of Example II was repeated except that loosely packed spherical glass beads (Glass-Shot$_{T.M.}$) normally 0.023 to 0.033 inch in diameter were provided in the space 22 of chamber 19 so that they had freedom of movement with the piston 20 in position *b* as shown in FIGURE 4 and so that void spaces adjacent to the burrs were present. Upon ignition it was found that the shaped article 10 was very smooth and free from superfluous projections and sharp edges. The glass beads tended to adhere to the shaped article 10 under these conditions but were easily removed from the shaped atricle 10 and chamber 19.

The glass beads used in Example V are conventional glass bead abrasives used in pneumatic blasting and cleaning. Also, various ceramic, metal and even plastic beads were used with good result. Further, various irregularly shaped particles of abrasive were used with good result.

The following Example VI illustrates the use of the shaped article as part of the confined space in the removal of internal superfluous projections.

Example VI

An article of manufacture 42 with superfluous projections 43a on splines 43 was provided as shown in FIGURES 7 and 8 which had threads 42a and 42b at both ends. The article 42 was made of steel with a splined bore 43 and had an inside major diameter of one-half inch (½″) and minor diameter of seven-sixteenths inch (7/16″) and an outside diameter of one inch (1″). One end was closed and sealed with a cover or cap 44 which was screwed onto the threads 42a of the article 42. At the opposite end of the article 42, a second cover or cap 45 was screwed onto the threads 42b of the article 42 to provide a sealed closure. Fitted through the cover 45 was a spark plug 46 which led into the confined space defined by the article 42 and covers 44 and 45. A conduit 47 with a valve 47a was also provided leading into the confined space through the cover 45. The spark plug 46 was connected through a switch S to an ignition system 48.

A combustible gaseous mixture of hydrogen 50% by volume and oxygen 50% by volume was then provided in the confined space with valve 47a open at a pressure of 900 p.s.i.g. and then the valve 47a was closed. The spark plug 46 was used to ignite the combustible gaseous mixture by closing the switch S. Upon removing the covers 44 and 45 from the article 42, it was found that the superfluous projections 43a on splines 43 had been eliminated as shown in FIGURE 9.

As can be seen from Example VI, the internal portions of the article 42 with the superfluous projections 43a provides, upon closure, such as with the covers 44 and 45, a sealed and confined space which is capable of withstanding the transient elevated temperatures and pressures.

It will be appreciated that various closure means other than threaded covers can be used where only selected portions of the external and internal areas of the article are to be treated such as hydraulically actuated sealed pressure closures and the like. Further, the external dimensions of the article can be strengthened to withstand the elevated pressures such as with a conforming mold or otherwise surrounding the article to prevent rupture because of any pressures generated in the operation of the process.

The foregoing description is illustrative of a preferred process of the present invention. It will be appreciated that various other means for providing the transient elevated gaseous temperatures in the confined space can be used. Thus various closure means can be used for the chamber 19 shown in FIGURE 4 such as a fixed cover (not shown) in place of the piston 20 which provides the sealed and confined space. In this instance the regulation of the energy of the ignitable or decomposable composition is provided by adjusting the amount of the ignitable or decomposable composition and the pressure at which it is introduced if the ignitable or decomposable composition is a gas. It is also possible to adiabatically compress various gases in the confined space 22 using only the piston 20 by rapid movement from position $a$ to $b$, thereby eliminating the need for the reaction initiation device 27, as shown in FIGURES 10 and 11.

Another alternative is to propagate a hot shock wave through a gas in the sealed and confined space 22 which is inert or reactable with respect to the composition of the shaped article contained in the confined space 22 such as by explosively initiating the shock wave with a primary high explosive detonator charge placed within the confined space 22 and which is then electrically detonated, or by discharging a sufficiently energetic electric arc through the gas in the confined space. These methods are not preferred as they present difficulties in making certain the shock wave reaches the projections while it is still sufficiently energetic to remove the projections. In any event, any of the above alternatives must be performed rapidly, usually in less than a second, so that the thermal conductivity of the shaped article does not essentially eliminate the differential heating which would otherwise occur between the superfluous or unwanted projections and the main mass of the shaped article (or its shielding or masking heat sink) when the thermal effect is sufficiently transient. Additionally, non-transient heating can damage the shaped article by causing all of it to become too hot. Further, in any of the above procedures oxidizing, neutral or non-reacting, reducing or otherwise reactable conditions can be maintained. The amount of void or open space adjacent to each superfluous projection is not critical but must be large enough to contain sufficient thermal energy to result in projection or edge removal at the selected conditions of transient elevated temperature and pressure, which conditions are generally governed by the nature of the material of the shaped article and are such as to avoid damaging of the shaped article itself.

Additionally, it is desirable for the open or void spaces surrounding the superfluous projections and/or unwanted sharp portions of edges to be intercommunicating with each other so that the propagation of the transient elevated temperatures from the point of reaction initiation to all of the void spaces within the sealed and confined space will occur. Alternatively, multiple initiation points may be employed when the void spaces do not intercommunicate.

Certain shaped articles require masking, heat sinking or shielding of needed thin cross-section projections or surfaces such as knife edges or thin walled sections so that they will not be damaged. This is easily accomplished using a metal heat sink in contact with the needed part or a dipped or sprayed coating of polymer on the area to be masked or shielded. Such shielding or masking is well known in the art relating to protective coatings and the like and mechanical fixtures, to both properly position the shaped article within the sealed and confined space and protect its essential portions by shielding or heat sink provision, are easily provided.

The materials which the shaped article of manufacture can be composed of are essentially any material whose decomposition, sublimation or melting points are below the transient elevated temperatures and are for instance, metals, glasses, ceramics, cermets and various natural and synthetic polymeric materials, either singly or in combinations. Thus, for instance, stainless steels, copper, brass, cast iron, aluminum, glass, epoxy, phenolic, urea formaldehyde, methyl methacrylate resins, polyurethanes, cellulose acetate, polyvinyl chloride and its copolymers, polyethylene, polypropylene and the like shaped articles of manufacture have been treated by the process of the invention. The structure, shape and composition of the shaped article of manufacture must be such that it inherently is not damaged in the removal of the superfluous projections or suitable fixtures to protect it during the transient heat treatment must be used, such as by masking, heat sinking or shielding, and this depends upon the particular physical properties and geometry of the materials used for and in the article.

As is apparent from the foregoing description, the confined space is sealed from the atmosphere. This insures that the thermal energy from the transient elevated temperatures is uniformly directed to the article of manufacture or selected parts of the article of manufacture and can be controlled in its work effect in a reliable and reproducible manner. Without such a sealed and confined space, the treatment would tend to be directionally oriented and non-uniform and, in most instances the inability to pressurize the treatment area to super atmospheric pressures or the immediate expansion of the hot gas upon reaction initiation would result in insufficient transfer of thermal energy to accomplish the removal of the superfluous projections. Also as previously stated there must be open spaces within the confined space surrounding the superfluous projections on the article of manufacture for the transient elevated gaseous temperatures to be effective. The sealed and confined space eliminates extraneous or secondary reactions, such as with air.

In instances where high energies are being used as with ferrous metals, it has been found desirable to fix the article being treated within the confined space in order to insure uniformity of treatment and to avoid damage to the article. Further, it has been found to be desirable to use a chamber which generally outlines the outside dimensions of the article of manufacture in the manner of a mold and to avoid excessively large open spaces within the sealed and confined space surrounding the article of manufacture when the thermal energies are high.

One preferred type of apparatus or equipment used in the preferred process of the present invention comprises: (a) a chamber with walls defining a confined space capable of being sealed off from the atmosphere and of withstanding transient elevated gaseous temperatures and pressures; (b) drive means actuating at least one piston connected by a first conduit means to the chamber which provides elevated gaseous material pressures within the sealed and confined space of the chamber by compressing a gaseous material within the sealed and confined space; (c) a second conduit means connected to the chamber for providing a gaseous material within the sealed and confined space; and (d) means connected with the chamber for initiating in the compressed gaseous material provided in the sealed chamber transient elevated gaseous temperatures within the sealed chamber. An important feature of this equipment is the driving means actuating a piston for providing elevated pressures on a gaseous material within the confined space. This can be accomplished by a mechanically, hydraulically or pneumatically actuated piston 19 as shown in FIGURE 4. Also, it will be appreciated that the piston means can be provided in a separate chamber as illustrated in FIGURE 5. Thus, a free piston 30 is provided in a cylindrical chamber 29 provided with a pipe 31 leading into the chamber 29 on one side of the piston 30. On the opposite side of the piston 30, a second pipe 32 fitted with an inlet pipe 33 with a valve 34 (to be considered as closed initially) is provided leading into the chamber 35 from chamber 29. A cover or cap 36 which screws into the top side of the chamber 35 is provided. At the opposite side of the chamber 35 a spark plug 37 or other ignition means leads into the chamber 35. The spark plug 37 is connected to a suitable electrical system, such as a 5000 volt transformer T with one terminal of the high voltage side being connected to ground G and the other terminal connected to the spark plug 37, and the low voltage side to a 115 volt, 60 cycle current source through switch S.

In operation usually an ignitable or decomposable gaseous material is provided in the confined spaces 29a and 35a of the chambers 29 and 35 causing the piston 30 to be in position c. Valve 34 is closed and piston 30 is then moved to position d to compress the gas in the confined space 35a by introducing a second pneumatic gaseous material or a hydraulic liquid material into the chamber 29 through pipe 31. The ignition of the ignitable composition is completed by actuating the switch S or a suitable decomposition initiator is used in place of the spark plug if necessary. For example, a common high explosive detonator cap is substituted for the spark plug and is electrically detonated to produce a shock wave which will in turn initiate the decomposition of gases such as acetylene maintained under elevated pressure within the confined space.

In the preferred operation of the equipment shown in FIGURE 5, an ignitable and combustible gaseous composition is introduced through the pipe 33 with valve 34 open into the confined spaces 29a and 35a. Valve 34 is closed and then piston 30 is actuated from position c to d to compress the ignitable gaseous composition.

Various closure means can be used for the chamber 35 which cain have essentially any shape. It is preferred that the piston means used in the apparatus of the present invention have a circular cross-section; however, other piston cross-section shapes can be used with good result.

FIGURE 10 illustrates the use of an externally developed force F for providing a transient elevated temperature adiabatically. The part 51, having superfluous projections is positioned in a sealed and confined space 52 within the cylinder 53 and one wall comprises a floating piston 54. Active or inert gases are introduced to the sealed and confined space through the port 55 through the wall of the cylinder 53 by means of conduit 56 selectively opened and closed by valve 57. Externally applied force F moves the free piston 54 toward the part 51 thereby accomplishing adiabatic compression of the gas which produces transient high temperatures. This removes the superfluous projections on the part 51. Stop ring 58 assures against overrun of the piston 54 thereby avoiding damage to part 51. A tool holding and closing plate 59 is provided to secure the part 51 and a securing seal is accomplished as by a sliding wedge block 60.

FIGURE 11 shows an extension of the structure shown in FIGURE 10 wherein the force F is accomplished by application of explosive pressures to the free piston 54 by combustion of an oxidizable gas and an oxidizer gas inserted separately into the combustion chamber 61 from ports 62 and 63 via conduits 64 and 65, respectively, selectively opened and closed by valves 66 and 67, respectively. The fuel mixture is ignited by the spark or glow plug 68. It will be appreciated that in the FIGURES 10 and 11 the force F is not directly applied to the part 51. Rather, an adiabatic compression causes the desired transient thermal energy.

FIGURE 12 is another modified form of structure for subjecting the part 71 positioned and located in the sealed and confined space 72 to elevated transient temperatures in accord with the present invention, but wherein an autoignition or autogenetic initiation of combustion is adiabatically accomplished by external elevation of gas pressure to the ignition point of the fuel mixture inserted in the chamber 72 as through ports 73 and 74 via fuel conduits 75 and 76, respectively, and as selectively controlled by valves 77 and 78, respectively. Preignition pressure is applied to the fuel mixture by applying force F' to the piston 79 forcing it toward the part 71 in the cylinder 80 formed by the walls defining the sealed and confined space 72. Ignition occurs at a point in the piston 79 motion when the adiabatically induced temperature rise in the fuel mixture reaches the autoignition temperature of the specific fuel mixture used. The stop ring 81 prevents overrun of the piston 79 thereby avoiding accidental damage to the part 71.

The following is an example showing the use of adiabatic compression of a gas to deburr an identical part as shown in Example I.

Example VII

Using the apparatus shown in FIGURE 10, a polycarbonate piston 54 was provided in a steel cylinder 53. An oxygen atmosphere at 15 p.s.i. absolute was provided in the sealed and confined space 52 along with part 51. The piston 54 was driven by suddenly applying a gas pressure of 1100 p.s.i. to the piston 54 to compress the oxygen in the sealed and confined space 52 to 600 p.s.i. absolute. The compression ratio was about 40 to 1. It was found that the part 51 was effectively deburred.

It is intended that the foregoing description be only illustrative of the present invention and that the present invention be limited only by the hereinafter appended claims.

We claim:
1. The process for the elimination of superfluous thin cross-section surface projections including unwanted burrs and sharp edges on an article of manufacture with a much thicker cross-section, the projections being produced as the result of shaping or fabricating which forms the article of manufacture, which comprises:
   (a) providing a sealed and confined space surrounding the superfluous surface projections to be eliminated on the article of manufacture such that there are open spaces within the sealed and confined space surrounding the superfluous projections to be eliminated; and
   (b) generating a transient thermal energy release in a gaseous medium thereby producing transient elevated gaseous temperatures in the open spaces within the sealed and confined space sufficient thermal energy being generated to thermally eliminate the superfluous projections without damage to the article of manufacture.

2. The process of claim 1 wherein the confined space is defined by walls capable of withstanding without rupture the transient elevated gaseous temperatures and attendant pressure resulting therefrom and wherein the article of manufacture is introduced into the sealed and confined space so defined.

3. The process of claim 1 wherein the article of manufacture has selected external and internal portions with superfluous projections and wherein the selected external and internal portions of the article of manufacture provide upon closure the confined space which withstands the elevated gaseous temperatures and any attendant pressures resulting therefrom for the elimination of the superfluous projections.

4. The process of claim 1 wherein a gaseous oxidizing material is provided in the confined space which oxidizes superfluous projections simultaneously with the production of the transient elevated gaseous temperatures within the confined space.

5. The process of claim 1 wherein reducing conditions are maintained in the confined space upon production of the transient elevated gaseous temperatures within the confined space such that the oxidation of the article is prevented.

6. The process of claim 1 wherein the transient elevated gaseous temperatures are produced by initiating a reaction in a composition which produces transient elevated gaseous temperatures in the sealed and confined space.

7. The process of claim 6 wherein the transient elevated gaseous temperatures are produced by the ignition of a combustible gaseous mixture of an oxidizer gas and an oxidizable gas in the sealed and confined space.

8. The process of claim 7 wherein the gaseous mixture is hydrogen and oxygen.

9. The process of claim 7 wherein the gaseous mixture is natural gas and oxygen.

10. The process for the elimination of superfluous thin cross-section surface projections including unwanted burrs and sharp portions of edges resulting from the mechanical shaping of a relatively much thicker cross-section article of manufacture which comprises:
(a) providing the mechanically shaped article of manufacture with superfluous projections composed of a material and with a structure such that it resists damage when exposed to transient elevated gaseous temperatures and pressures sufficient to eliminate the superfluous projections and any damageable essential parts of the structure being protected from such transient elevated gaseous temperatures and pressures;
(b) introducing the article with the superfluous projections into a sealed and confined space defined by walls capable of withstanding the transient elevated gaseous temperatures and pressures sufficient to eliminate the superfluous projections so that there are open spaces within the sealed and confined space surrounding the superfluous projections;
(c) generating a transient thermal energy release in a gaseous medium thereby producing transient elevated gaseous temperatures and pressures in the sealed and confined space sufficient thermal energy being generated to thermally eliminate the superfluous projections without damage to the article of manufacture; and
(d) removing the article of manufacture, with the superfluous projections eliminated, from the sealed and confined space.

11. The process of claim 10 wherein the transient elevated gaseous temperatures and pressures are produced by the ignition of a combustible gaseous mixture of an oxidizer gas and an oxidizable gas in the sealed and confined space and wherein there is a molar excess of the oxidizable gas over the requirements for reaction with the oxidizer gas to prevent the oxidation of the article of manufacture.

12. The process of claim 10 wherein the transient elevated gaseous pressures and temperatures are produced by initiating a reaction in a composition which produces transient elevated gaseous temperatures and pressures in the sealed and confined space and wherein in addition particles of a solid material are provided in the sealed and confined space to facilitate the elimination of the superfluous projections by moving contact with the article of manufacture and the superfluous projections resulting from the reaction initiation in the composition.

13. The process of claim 10 wherein the mechanically shaped article of manufacture with the superfluous projections also has needed surfaces which are protected by masking to prevent damage by the transient elevated temperatures and pressures.

14. The process of claim 10 wherein the transient elevated gaseous temperatures and pressures are produced by the ignition of a combustible gaseous mixture of an oxidizer gas and an oxidizable gas in the sealed and confined space and wherein there is a molar excess of the oxidizer gas over the requirements for reaction with the oxidizable gas sufficient to oxidize the superfluous projections on the article of manufacture.

15. The process of claim 14 wherein in addition the surfaces of the article of manufacture are subsequently cleaned.

16. The process of claim 14 wherein the oxidizer gas is oxygen.

17. The process of claim 10 wherein the transient elevated gaseous temperatures and pressures are produced by the substantially adiabatic compression of a gas in the sealed and confined space.

18. The process of claim 17 wherein the gas is an inert gas.

19. The process of claim 17 wherein the gas is an oxidizer gas.

20. The process of claim 17 wherein the gas is an oxidizable gas.

21. The process of claim 17 wherein the gas is an oxidizer gas.

22. The process of claim 21 wherein the oxidizer gas is oxygen.

23. A process for removal of superfluous projections including unwanted burrs and sharp edges extending from an article of manufacture and wherein the superfluous projections are the consequence of forming, fabricating, shaping or machining, which comprises: extending the superfluous projection into a sealed and confined open space and generating a transient thermal energy release in a gaseous medium thereby producing transient elevated gaseous temperatures in the open spaces within the sealed and confined space sufficient thermal energy being generated to thermally eliminate the superfluous projection without material alteration of the dimensions and configuration of the article of manufacture.

24. The process for effecting localized dimensional changes by the removal of thin cross-section portions of the surfaces of an article of manufacture without substantially affecting the established base dimensions of the article which comprises:
(a) providing the surfaces of the article of manufacture requiring the localized dimensional changes by the removal of the thin cross-section portions thereon in a sealed and confined space such that there are open spaces surrounding the thin cross-section portions; and
(b) generating a transient thermal energy release in a gaseous medium thereby producing transient elevated gaseous temperatures in the open spaces within the sealed and confined space sufficient thermal energy being generated to thermally effect the localized dimensional changes by the removal of the thin cross-section portions on the surfaces within the sealed and confined space without substantially affecting the established base dimensions of the article.

References Cited

UNITED STATES PATENTS

| | | | |
|---|---|---|---|
| 1,601,952 | 10/1926 | Floyd | 134—2 |
| 2,199,418 | 5/1940 | Redmond et al. | 134—19 XR |
| 2,892,733 | 6/1959 | Gardner et al. | 117—46 |
| 3,205,105 | 9/1965 | Oster | 134—3 XR |
| 3,252,312 | 5/1966 | Maier | 72—56 |
| 3,371,404 | 3/1968 | Lemelson | 29—421 |

MORRIS O. WOLK, Primary Examiner

JOSEPH T. ZATARGA, Assistant Examiner

U.S. Cl. X.R.

29—421, 557; 72—38, 56; 134—19